United States Patent Office.

PAUL BRICK, OF CAPE ELIZABETH, MAINE.

PREPARING AND PRESERVING MACKEREL, &c.

SPECIFICATION forming part of Letters Patent No. 241,187, dated May 10, 1881.

Application filed January 14, 1881. (No specimens.)

*To all whom it may concern:*

Be it known that I, PAUL BRICK, of Cape Elizabeth, in the county of Cumberland and State of Maine, have invented certain new and useful Improvements in Preparing and Preserving Mackerel and other Fresh Fish; and I do hereby declare that the following is a full, clear, and exact description of the invention, which will enable others skilled in the art to which it appertains to make and use the same.

My invention consists in a process for the treatment of fresh mackerel and other fishes for the preservation of the same, and with a view of imparting to them an agreeable taste and flavor, and also for the product of such process.

The different steps of my process are as follows:

First, I take fresh mackerel, cut them up in pieces—say of two inches in length—and properly clean them. I then prepare a souse or pickle composed of cider-vinegar, spices, such as cloves, nutmeg, and others; also, parsley, bay-leaf, and onions. To a given quantity of the cider-vinegar such amount of the spices, parsley, bay-leaf, and onions may be added as will give the liquor the required or desired flavor. In this preparation I place and keep the fish for twelve hours. This first souse or pickle is thus used in a cold state.

Second, I then remove the fish from the liquid preparation above described and place them in another. It is necessary to throw away the above-mentioned first souse or pickle, owing to impurities acquired by its first use. The blood and serum cannot easily be wholly removed from the fish while they are being cleaned, and before they are placed in the souse or pickle, without exposing them to softening somewhat and losing the firmness of the flesh, which is one of the important qualities of my preserved fish. To insure the fish being subjected to the souse or pickle in as solid condition of the flesh as possible, I put them in while they have yet a little blood or serum, sufficient to taint the first souse or pickle and render it necessary to use a second one for the permanent bath. I make the second souse or pickle exactly like the first one above described, except that I add to it capers, olive-oil, Worcestershire sauce, and extract of anchovy, in the proportions of about one tea-cup of capers, one-half pint of olive-oil, one gill of Worcestershire sauce, and two table-spoonfuls of extract of anchovy, and two lemons to one gallon of the first-prepared souse or pickle. In this preparation I place and keep the fish for ten hours. This second bath or preparation is used in a cold state up to this point. After the fish have thus been kept in the second cold bath for ten hours I apply heat for a period of four to eight hours at about 140° Fahrenheit, and simmer the fish as slowly as possible in the same bath or preparation in which they have lain cold for the ten hours, without removal therefrom and without change therein.

It is sometimes necessary to replace in the simmering the established quantity of one or two of the ingredients, owing to their evaporation in the simmering, being guided in this by the flavor in tasting, more particularly the olive-oil.

To make the souse or pickle described in the paragraph of this specification headed "first," I use in one gallon of strong pure cider-vinegar one-half ounce of green parsley, eight leaves of bay, four ounces of onions, one-half pound of common salt, and one ounce of the following spices, mixed in equal parts: mustard-seed, cloves, allspice, mace, cinnamon, and pepper.

The preparation described in paragraph marked "second" herein is composed of exactly the same as the above described, to which I add one tea-cup of capers, one-half pint of olive-oil, two spoonfuls of Worcestershire sauce, two spoonfuls of anchovy, and two lemons.

The fish are packed in an air-tight pot or jar in the same liquid in which they have been soused or bathed the second time, and the heat is applied and the simmering accomplished in this jar or pot.

By this process the firmness of the flesh is preserved, while the bones of the fish are softened, so as not to be perceptible when the fish are being eaten.

I do not intend to limit the use of my process to mackerel only. I find equally good results with other freshly-caught fish. I especially mention mackerel, because they can be procured in the waters about me so abundantly, cheaply, and in such firm fresh condition of the flesh as to make my process of especial value in respect of them.

What I claim as my invention, and desire to secure by Letters Patent, is—

1. The process of preparing and preserving mackerel and other fish herein described, which consists in cutting them up into pieces of about two inches in length and cleaning them, then placing them for twelve hours in a cold souse or pickle made of one gallon of strong pure cider-vinegar, one-half ounce of green parsley, eight leaves of bay, four ounces of onions, one-half pound of common salt, and one ounce of the following spices mixed in equal parts: mustard-seed, cloves, allspice, mace, cinnamon, and pepper; then, at the end of twelve hours, removing the fish from this souse or pickle, which is then thrown away, and then placing the fish which have been subjected to the souse or pickle above described for ten hours in a second cold souse or pickle composed of the ingredients which constitute the first-mentioned one, and in the same proportions, to which are added one tea-cup of capers, one-half pint of olive-oil, one gill of Worcestershire sauce, two table-spoonfuls of extract of anchovy, and two lemons; then packing the fish in air-tight pots in the souse or pickle last described, and then simmering the fish in this souse or pickle in these pots for a period of four to eight hours at about 140° Fahrenheit, this simmering being conducted as slowly as possible.

2. The product of soused or pickled fish prepared in the manner and by the process herein set forth.

In testimony that I claim the foregoing as my own I affix my signature in presence of two witnesses.

PAUL BRICK.

Witnesses:
 DANIEL D. WILLARD,
 DAVID U. WILLARD.